United States Patent
Makhlouf et al.

(10) Patent No.: US 8,879,447 B1
(45) Date of Patent: Nov. 4, 2014

(54) METHOD AND APPARATUS FOR MITIGATING PHYSICAL UPLINK CONTROL CHANNEL (PUCCH) INTERFERENCE IN LONG TERM EVOLUTION (LTE) SYSTEMS

(71) Applicant: Motorola Solutions, Inc., Schaumburg, IL (US)

(72) Inventors: Isam R Makhlouf, Lake Zurich, IL (US); Ethan Y Chen, Wilmette, IL (US); Dennis M Drees, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 14/045,636

(22) Filed: Oct. 3, 2013

(51) Int. Cl.
  *H04B 7/00* (2006.01)
  *H04W 72/04* (2009.01)
  *H04W 72/08* (2009.01)

(52) U.S. Cl.
  CPC ........ *H04W 72/0413* (2013.01); *H04W 72/082* (2013.01); *H04W 72/042* (2013.01)
  USPC ...................................... 370/310.2; 370/349

(58) Field of Classification Search
  CPC .......... H04W 72/082; H04W 72/0413; H04W 72/042
  USPC .............. 370/349, 310.2, 328, 329, 336, 338, 370/341
  See application file for complete search history.

(56) References Cited

U.S. PATENT DOCUMENTS

| | | | |
|---|---|---|---|
| 2005/0018784 A1* | 1/2005 | Kurobe et al. | 375/260 |
| 2007/0047502 A1 | 3/2007 | Marinier et al. | |
| 2008/0146172 A1 | 6/2008 | Makhlouf et al. | |
| 2009/0203323 A1 | 8/2009 | Ratasuk et al. | |
| 2010/0195575 A1 | 8/2010 | Papasakellariou et al. | |
| 2012/0163291 A1 | 6/2012 | Zhu et al. | |
| 2012/0307781 A1 | 12/2012 | Enomoto et al. | |
| 2012/0320853 A1* | 12/2012 | Kwon et al. | 370/329 |
| 2013/0083766 A1 | 4/2013 | Chung et al. | |
| 2013/0114450 A1 | 5/2013 | Xu et al. | |

OTHER PUBLICATIONS

Marc Lichtman, "A Jamming Vulnerability Assessment of LTE", PhD Qualifying Exam written report submitted to the Qualifying Exam Committee, Aug. 8, 2012.
Jeffrey H. Reed, et al., Virginia Tech, A Tresponse to the FirstNet NOI regarding the conceptual network architecture—LTE Jamming, Nov. 12, 2012.

* cited by examiner

*Primary Examiner* — Brenda H Pham
(74) *Attorney, Agent, or Firm* — Daniel R. Bestor (57) ABSTRACT

Disclosed herein are embodiments of a method and embodiments of an apparatus for mitigating physical uplink control channel (PUCCH) interference in Long Term Evolution (LTE) systems. In an embodiment, a wireless-communication device receives downlink transport blocks and responsively transmits corresponding acknowledgement messages via the PUCCH. The device determines that an excessive number of unsolicited (i.e., already-acknowledged) retransmitted downlink transport blocks has been received, and responsively: transmits a scheduling-request message via a random access channel (RACH) and obtains a physical uplink shared channel (PUSCH) scheduling grant, accesses pseudo uplink data, annexes uplink-feedback data to the pseudo uplink data, and transmits the pseudo uplink data and annexed uplink-feedback data via the PUSCH in accordance with the obtained PUSCH scheduling grant.

20 Claims, 7 Drawing Sheets

METHOD AND APPARATUS FOR MITIGATING PHYSICAL UPLINK CONTROL CHANNEL (PUCCH) INTERFERENCE IN LONG TERM EVOLUTION (LTE) SYSTEMS

BACKGROUND OF THE INVENTION

Wireless communication and mobile technology are quite prevalent in modern society, and becoming more so all the time. Millions of people around the world use numerous types of wireless-communication devices to communicate with other communication devices, including other wireless-communication devices, both directly and/or via one or more networks. In a typical arrangement, a user interacts with a portable and mobile wireless-communication device known by terms such as mobile station, mobile subscriber unit, access terminal, user equipment (UE), cell phone, smartphone, personal digital assistant (PDA), tablet, and the like.

Furthermore, such a wireless-communication device typically communicates over a defined air interface with one or more entities of what is known and referred to herein as a radio access network (RAN), which may also be known by terms such as (and/or form a functional part of) a cellular wireless network, a cellular wireless telecommunication system, a wireless wide area network (WWAN), and the like. For illustration and not by way of limitation, the balance of this disclosure uses UEs as example wireless-communication devices and RANs as example wireless-communication systems (i.e., networks) via which the referenced UEs engage in wireless communication. And though many wireless-communication protocols exist, the balance of this disclosure uses Long Term Evolution (LTE) as an illustrative example.

In the context of a given RAN, the entity with which the UE directly communicates over the air interface is known by terms such as base station, base transceiver station (BTS), and the like. In the parlance of LTE and in the balance of this description, this entity is referred to as an eNodeB. The communication link via which data is transmitted from the eNodeB to UEs is known as the downlink, while the communication link via which data is transmitted from UEs to the eNodeB is known as the uplink. And LTE uses different air-interface technologies on the downlink and uplink. In particular, LTE employs a technology known as Orthogonal Frequency Division Multiple Access (OFDMA) on the downlink while employing a technology known as Single Carrier Frequency Division Multiple Access (SC-FDMA) on the uplink.

On the downlink, LTE defines several physical-layer data and control channels. The downlink physical-layer data channels are known as the physical broadcast channel (PBCH), the physical downlink shared channel (PDSCH), and the physical multicast channel (PMCH), while the downlink physical-layer control channels are known as the physical downlink control channel (PDCCH), the physical control format indicator channel (PCFICH), and the physical hybrid-ARQ (automatic repeat query) indicator channel (PHICH). The PDSCH is the primary traffic-bearing channel on the downlink, and is used by the eNodeB to transmit data in the form of downlink transport blocks to the various UEs to which the eNodeB is providing service.

On the uplink, LTE defines three physical-layer channels, known as the physical uplink shared channel (PUSCH), the physical uplink control channel (PUCCH), and the physical random access channel (PRACH). In general, the PUSCH is designated for carrying user data and some control information, the PUCCH is designated for carrying uplink-feedback data (e.g., media access control (MAC) uplink-feedback data) and requests to be scheduled for uplink user-data transmission, and the PRACH is designated for purposes such as initial UE access, service requests (i.e., switching from idle to active mode), and reestablishing uplink synchronization.

In LTE, as is the case with other protocols, certain constructs are defined to promote, among other goals, the reliability and efficiency of wireless communication. One such construct is known as a retransmission scheme (or protocol), which typically involves acknowledgement (and, explicitly and/or implicitly, non-acknowledgement) and timeout mechanisms at one or more layers (e.g., physical, MAC, etc.) of the Open Systems Interconnection (OSI) model (or "stack"). Messages that are sent to acknowledge successful receipt of a certain quantum of data (e.g., a packet, a transport block, or the like) are often known as ACKs, and messages that are sent to indicate failure to successfully receive a certain quantum of data are often known as NACKs (or NAKs), while failure to receive either an ACK or NACK is typically interpreted as a NACK. At the MAC layer, LTE uses hybrid ARQ (HARQ), which employs both ARQ and forward error correction (FEC). At the radio link control (RLC) layer, LTE uses ARQ.

In LTE, UEs are configured such that: (i) at times when they do not have uplink data (a.k.a. user data, user traffic, and the like) to send but do have uplink-feedback data (e.g., ACKs, NACKs, channel quality indicator (CQI) feedback, rank indications, and the like) to send, they send the uplink-feedback data via the PUCCH; and (ii) at times when they have both uplink data and uplink-feedback data to send, they annex (i.e., "piggyback") the uplink-feedback data to the uplink data and send the combination via the PUSCH. The annexation may involve multiplexing the uplink data and the uplink-feedback data together, though it could just as well involve any other type or types of annexation, such as prepending, appending, and the like.

If enough interference is present on the PUCCH, ACKs sent via that channel may not be successfully received and decoded by the eNodeB, which would typically then behave as if it had received a NACK, by retransmitting the corresponding downlink transport block(s). As will be appreciated by those of skill in the relevant art, the effective throughput on the downlink is reduced by such unnecessary retransmission, perhaps not only for that UE but quite possibly also for one or more other UEs arranged to use shared air-link resources. As such, there is a need for a method and an apparatus for mitigating PUCCH interference in LTE systems.

BRIEF DESCRIPTION OF THE SEVERAL VIEWS OF THE DRAWINGS

The accompanying figures, where like reference numerals refer to identical or functionally similar elements, together with the detailed description below, are incorporated into and form part of the specification, and serve to further illustrate embodiments of the following claims, and explain various principles and advantages of those embodiments.

Those having skill in the relevant art will appreciate that elements in the figures are illustrated for simplicity and clarity, and have not necessarily been drawn to scale. For example, the dimensions of some of the elements in the figures may be exaggerated relative to other elements to help to improve understanding of various embodiments. Furthermore, the apparatus and method components have been represented where appropriate by conventional symbols in the figures, showing only those specific details that are pertinent to understanding the disclosed embodiments so as not to obscure the disclosure with details that will be readily apparent to those having skill in the relevant art having the benefit of this description.

DETAILED DESCRIPTION OF THE INVENTION

One embodiment takes the form of method carried out by a wireless-communication device. The method includes receiving downlink transport blocks and responsively transmitting corresponding ACKs via the PUCCH. The method further includes making what is referred to herein as a "PUCCH-compromised determination," which involves making a determination that a number of received retransmitted downlink transport blocks (for which the device had already sent corresponding ACKs) exceeds a retransmitted-block threshold. The method further includes, responsive to making the PUCCH-compromised determination: transmitting a random access channel (RACH) scheduling-request message and obtaining a PUSCH scheduling grant; accessing what is referred to herein as pseudo uplink data; annexing uplink-feedback data (e.g., ACKs and/or NACKs) to the pseudo uplink data; and transmitting the pseudo uplink data and annexed uplink-feedback data via the PUSCH in accordance with the obtained scheduling grant.

Another embodiment takes the form of a wireless-communication device equipped and configured with suitable hardware and instructions executable by the device for carrying out the functions set forth above in connection with the above-described method embodiment. These embodiments and others are further described below in connection with the figures.

Figure 1:
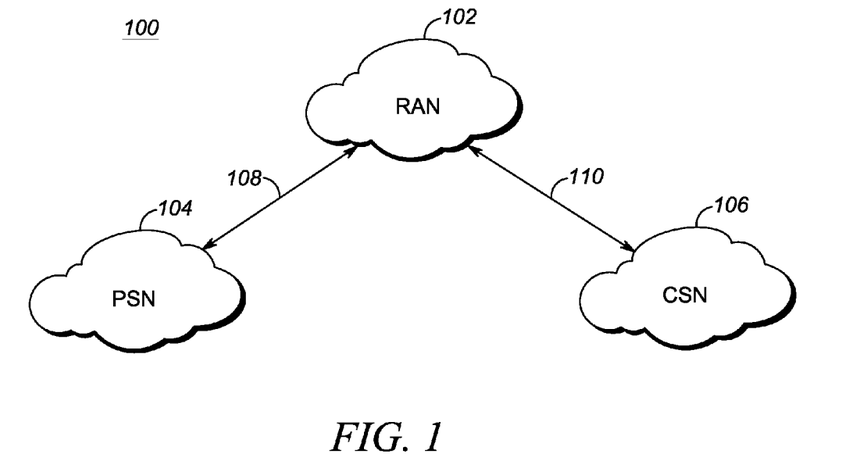
FIG. 1 depicts an example communication system.

FIG. 1 depicts communication system 100 as including a RAN 102, a packet-switched network (PSN) 104, and a circuit-switched network (CSN) 106. RAN 102 and PSN 104 are connected by a communication link 108, while RAN 102 and CSN 106 are connected by a communication link 110. Either or both of the links 108 and 110 could include one or more communication devices, nodes, networks, connections, switches, bridges, routers, and the like. Any or all of link 108 and/or any or all of link 110 could make use of wired and/or wireless forms of communication. One or more links instead of and/or in addition to links 108 and 110 could be present. For example, there could be one or more links between PSN 104 and CSN 106.

RAN 102 is discussed more fully below in connection with FIG. 2, but in general could be any RAN suitably equipped and configured by those of skill in the relevant art to function as described herein. PSN 104 could be the worldwide network of data networks usually referred to as the Internet, but could just as well be any other packet-switched network suitably equipped and configured by those of skill in the relevant art to function as described herein. Nodes resident on PSN 104 may be Internet Protocol (IP) nodes and may be addressed using IP addresses. CSN 106 could be the circuit-switched communication network commonly referred to as the Public Switched Telephone Network (PSTN), but could just as well be any other circuit-switched network suitably arranged and configured by those of skill in the relevant art to function as described herein.

Figure 2:
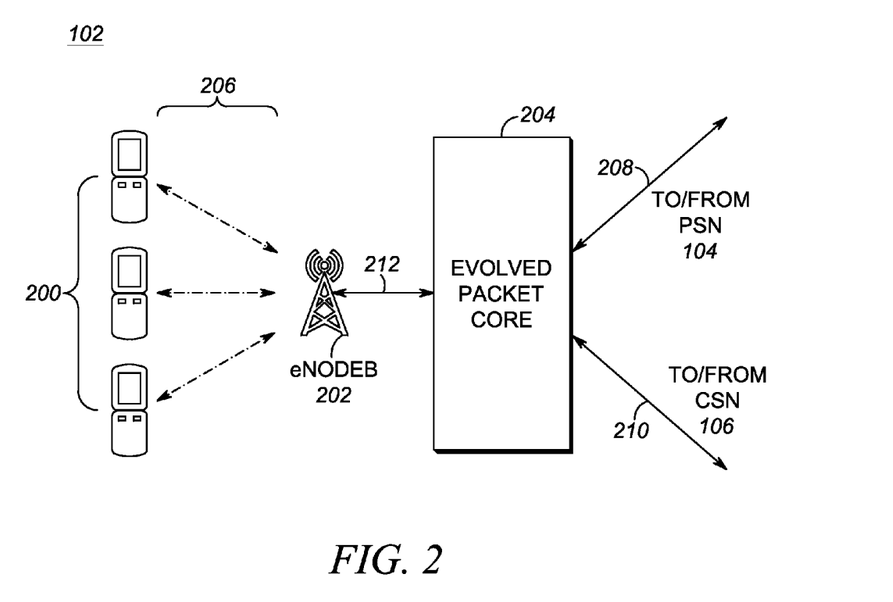
FIG. 2 depicts an example LTE RAN via which one or more UEs can communicate.

FIG. 2 depicts aspects of an example LTE RAN via which one or more UEs can communicate. In particular, FIG. 2 depicts RAN 102 of FIG. 1 and further depicts a plurality of UEs 200 engaged in wireless communication with RAN 102 via an air interface 206. An example UE 200 is described more fully below in connection with FIG. 3, though in general any UE 200 may be any type of UE or other wireless-communication device suitably equipped and configured by those of skill in the relevant art to function as described herein.

As depicted in FIG. 2, RAN 102 includes an eNodeB 202 and an evolved packet core (EPC) 204, as well as communication links 208, 210, and 212. An example eNodeB 202 is described more fully below in connection with FIG. 4, though in general eNodeB 202 may take on one or more alternate forms suitably equipped and configured by those of skill in the relevant art to function as described herein. Moreover, while three UEs 200 and one eNodeB 202 are depicted in FIG. 2, this is done by way of illustration and not by way of limitation, as any suitable number of either could be present in a given implementation.

As known to those of skill in the relevant art, EPC 204 may include network entities such as one or more mobility management entities (MMEs), one or more serving gateways (SGWs), one or more packet data network (PDN) gateways (PGWs), one or more home subscriber servers (HSSs), one or more access network discovery and selection functions (ANDSFs), one or more evolved packet data gateways (ePDGs), and/or one or more other entities deemed suitable to a given implementation by those of skill in the relevant art. Moreover, these entities may be configured and interconnected in a manner known to those of skill in the relevant art to provide wireless service to UEs via eNodeBs and to bridge such wireless service with transport networks such as PSN 104 and CSN 106.

Air interface 206 may be an LTE air interface having an uplink and a downlink as known to those of skill in the relevant art. Some aspects of such an air interface are discussed below in connection with FIG. 5, though this is done by way of illustration and not by way of limitation, as those of skill in the relevant art are aware of the potential for variations among different implementations of a given protocol, and for similarities across different protocols.

Communication links 208, 210, and 212 may take on any suitable form, such as any of the forms described above in connection with links 108 and 110 of FIG. 1. Communication link 208 may take the form of or include or be connected to link 108 of FIG. 1. A network access server (NAS) (not depicted) may reside between links 108 and 208 to enable and facilitate communications between the two links. Communication link 210 may take the form of or include or be connected to link 110 of FIG. 1. A Voice over IP (VoIP) gateway (not depicted) may reside between links 110 and 210 to bridge circuit-switched communications on link 110 with packet-switched communications on link 210. Communication link 212 may function as what is known as a "backhaul" with respect to eNodeB 202, as link 212 may enable eNodeB 202 to bridge (i) communications conducted by eNodeB 202 with UEs 200 over air interface 206 with (ii) communications via the rest of RAN 102 and beyond.

Figure 3:
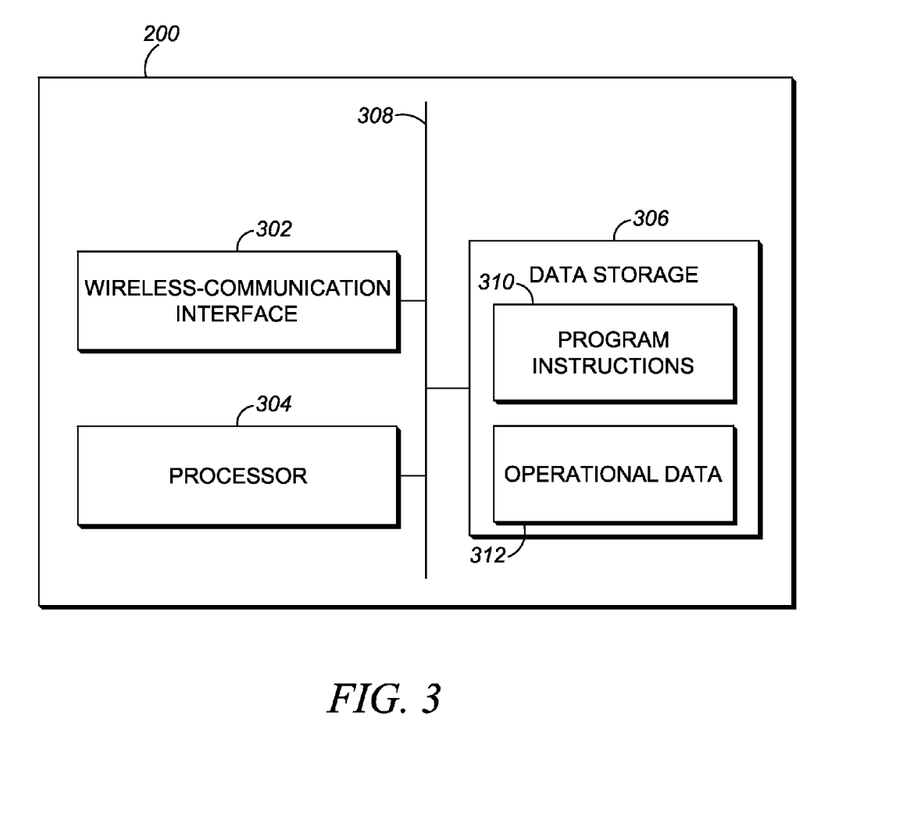
FIG. 3 depicts an example UE.

FIG. 3 depicts UE 200 as including a wireless-communication interface 302, a processor 304, and data storage 306, all of which are communicatively linked by a system bus or other suitable communication path 308. Wireless-communication interface 302 may include components such as one or more antennae, one or more transceivers/chipsets designed and configured for one or more types of wireless communication (e.g., LTE), and/or any other components deemed suitable by those of skill in the relevant art. Processor 304 may include one or more processors of any type deemed suitable by those of skill in the relevant art, some examples including a general-purpose microprocessor and a dedicated digital signal processor (DSP).

Data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, data storage 306 includes program instructions 310 executable by processor 304 for carrying out various combinations of the various UE (and more generally, wireless-communication-device) functions described herein with reference to FIGS. 5-8, and also includes operational data 312, which may include any one or more types of data pertinent to the operation of UE 200 described herein with reference to FIGS. 5-8.

Figure 4:
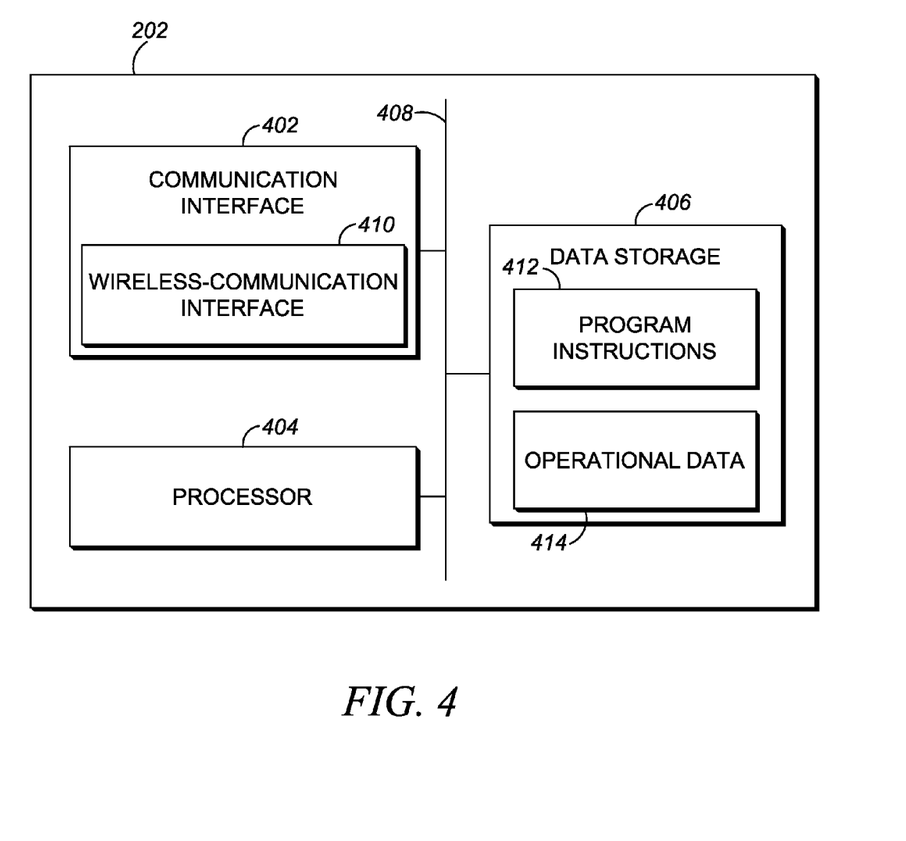
FIG. 4 depicts an example eNodeB.

FIG. 4 depicts eNodeB 202 as including a communication interface 402, a processor 404, and data storage 406, all of which are communicatively linked by a system bus or other suitable communication path 408. Communication interface 402 is depicted as including a wireless-communication interface 410, which may be similar in many aspects to wireless-communication interface 302 of FIG. 3, though interface 410 may be different from interface 302 in that interface 410 would be of a scale and configuration appropriate for acting on the network side—as opposed to the client side—of (e.g., LTE) wireless communications. As such, interface 410 would likely have a more substantial antenna structure, and would also include the appropriate equipment and circuitry (including multiple transceivers) for serving multiple UEs in a coverage area in accordance with the pertinent LTE standards known to those of skill in the relevant art. And in addition to wireless-communication interface 410, communication interface 402 may further include additional communication-interface technology such as one or more wired (e.g., Ethernet) communication interfaces for facilitating communication between eNodeB 202 and EPC 204 via communication link 212.

Processor 404 may include one or more processors of any type deemed suitable by those of skill in the relevant art, some examples including a general-purpose microprocessor and a dedicated DSP. Data storage 406 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 4, data storage 406 includes program instructions 412 executable by processor 404 for carrying out various combinations of the various eNodeB functions described herein with reference to FIGS. 5-8, and also includes operational data 414, which may include any one or more types of data pertinent to the operation of eNodeB 202 described herein with reference to FIGS. 5-8.

As discussed above, one technical aspect of LTE networks is the use on the uplink of SC-FDMA technology. Another is the division of the air interface in both the frequency and time domains. On the LTE uplink, the division of the air interface in the frequency domain takes the form of the single uplink carrier being divided into a series of adjacent sub-carriers each having a bandwidth of 15 kilohertz (kHz). Moreover, the uplink is demarcated into consecutive groups of 12 sub-carriers each, and it is these groups—called "resource blocks"— that form the smallest units of the uplink that can be allocated to a given UE in the frequency domain.

In the time domain, the LTE uplink is divided into 10-millisecond (ms) frames, each of which is divided into ten 1-ms sub-frames, where one such sub-frame forms the smallest unit of the uplink that can be allocated to a given UE in the time domain. Thus, the atomic unit of allocation on the LTE uplink is one resource block for one sub-frame. And each sub-frame is further divided into two time slots that each have a duration of 0.5 ms.

Figure 5:
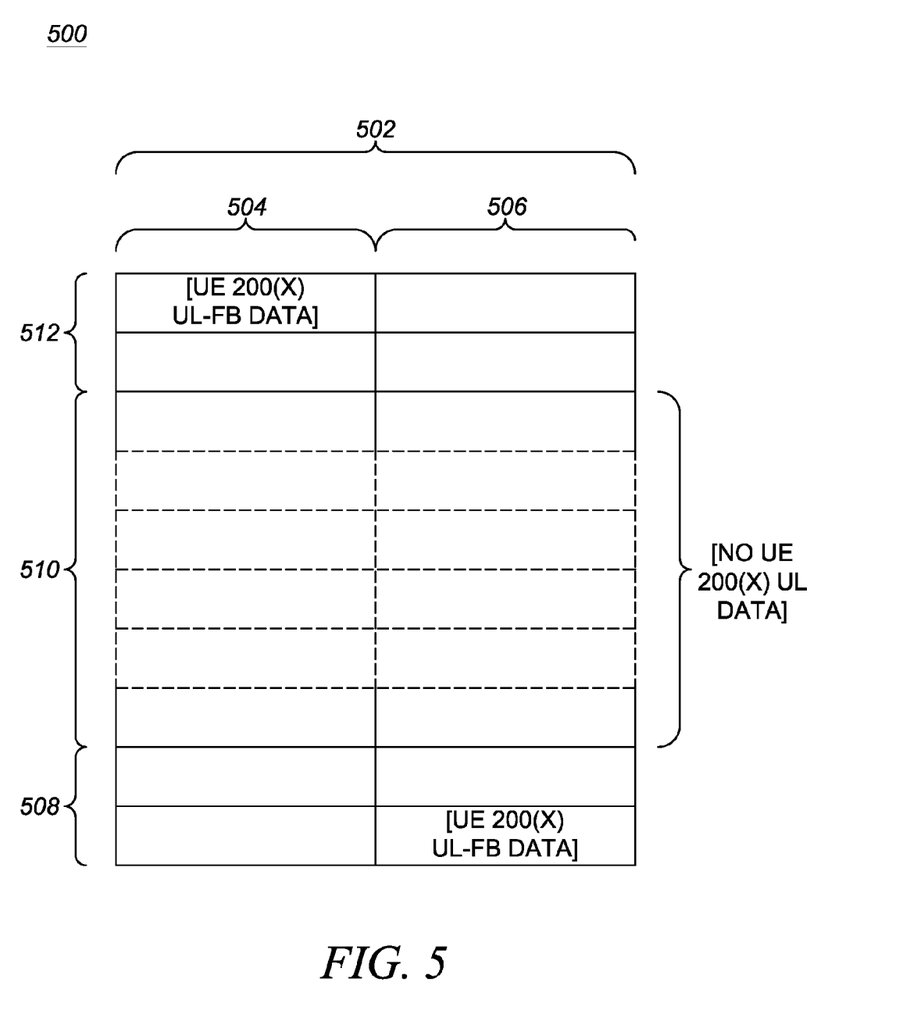
FIG. 5 depicts a first example LTE uplink sub-frame.

FIG. 5 depicts aspects of a first example LTE uplink sub-frame 500 having an overall duration 502 equal to 1 ms, where this duration is divided into a first time slot 504 and a second time slot 506, each of which have a duration of 0.5 ms as described above. In the frequency domain, sub-frame 500 is divided into an unspecified number of resource blocks, where each row of sub-frame 500 represents one such resource block.

FIG. 5 further depicts the resource blocks in sub-frame 500 as being grouped into a lower-edge group 508, a middle group 510, and an upper-edge group 512. Lower-edge group 508 and upper-edge group 512 are depicted in FIG. 5 as having exactly two resource blocks in each, though this is done for illustration and not by way of limitation, as one or both of those groups could have a different number of resource blocks.

In LTE, groups 508 and 512 would typically contain the PUCCH while group 510 would typically contain the PUSCH. PUCCH resources are allocated in resource-block pairs at opposite ends of the band (within groups 508 and 512) in the first and second time slot of each sub-frame. This provides frequency diversity and increases the likelihood of successful receipt. The PUCCH is more susceptible, however, to interference and signal degradation than is the PUSCH due to, among other characteristics, the PUCCH being both relatively narrowband and in a known location in the frequency domain.

Figure 6:
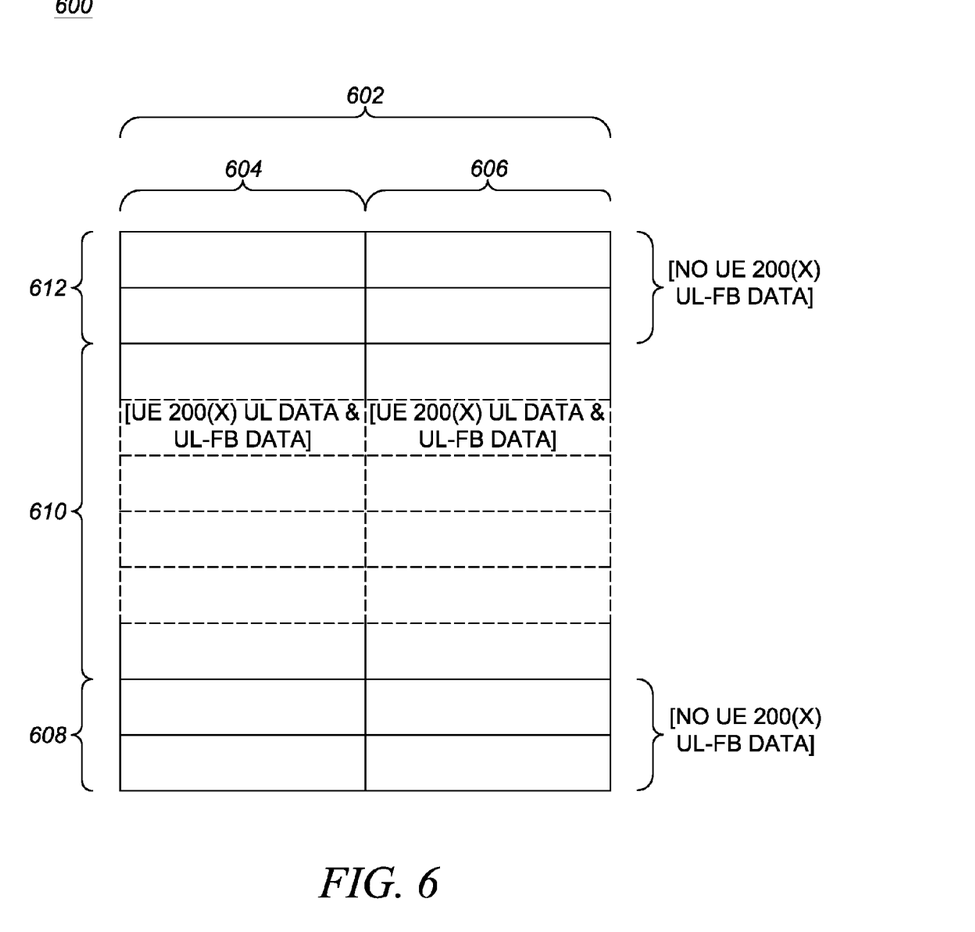
FIG. 6 depicts a second example LTE uplink sub-frame.
Figure 8:
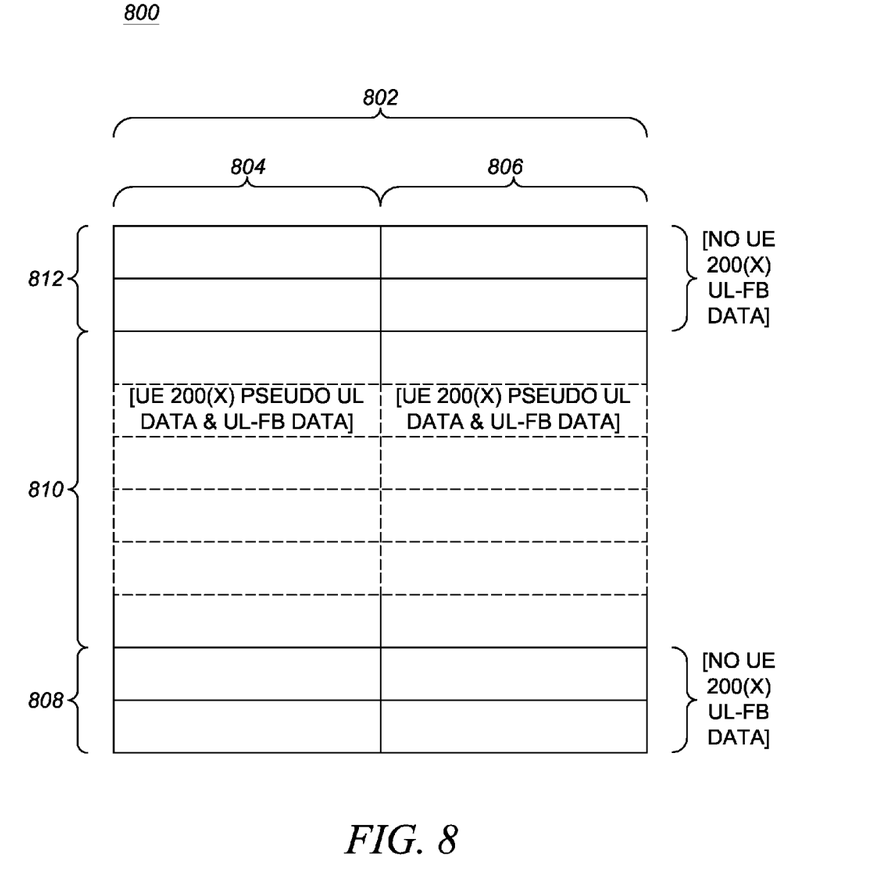
FIG. 8 depicts a third example LTE uplink sub-frame.

As discussed above and as depicted in FIG. 5, if a given UE (denoted UE 200(X) in FIGS. 5, 6, and 8) does not have uplink data to send but does have uplink-feedback data to send during a given sub-frame, UE 200(X) will send the uplink-feedback data via the PUCCH (groups 508 and 512). As shown in FIG. 5 and discussed above, UE 200(X) transmits the uplink-feedback data in both the first time slot of a resource block in group 512 and the second time slot of a resource block in group 508.

FIG. 6 depicts aspects of a second example LTE uplink sub-frame 600. FIG. 6 is similar to FIG. 5 in some aspects, and thus will be described with a focus on some relevant differences. As discussed above and as depicted in FIG. 6, if UE 200(X) has both uplink data and uplink-feedback data to send during a given sub-frame, UE 200(X) will annex the uplink-feedback data to (e.g., multiplex the uplink-feedback data with) the uplink data and then send the combined result via the PUSCH (group 610), and will not use the PUCCH (groups 608 and 612) to send any data during that sub-frame.

Figure 7:
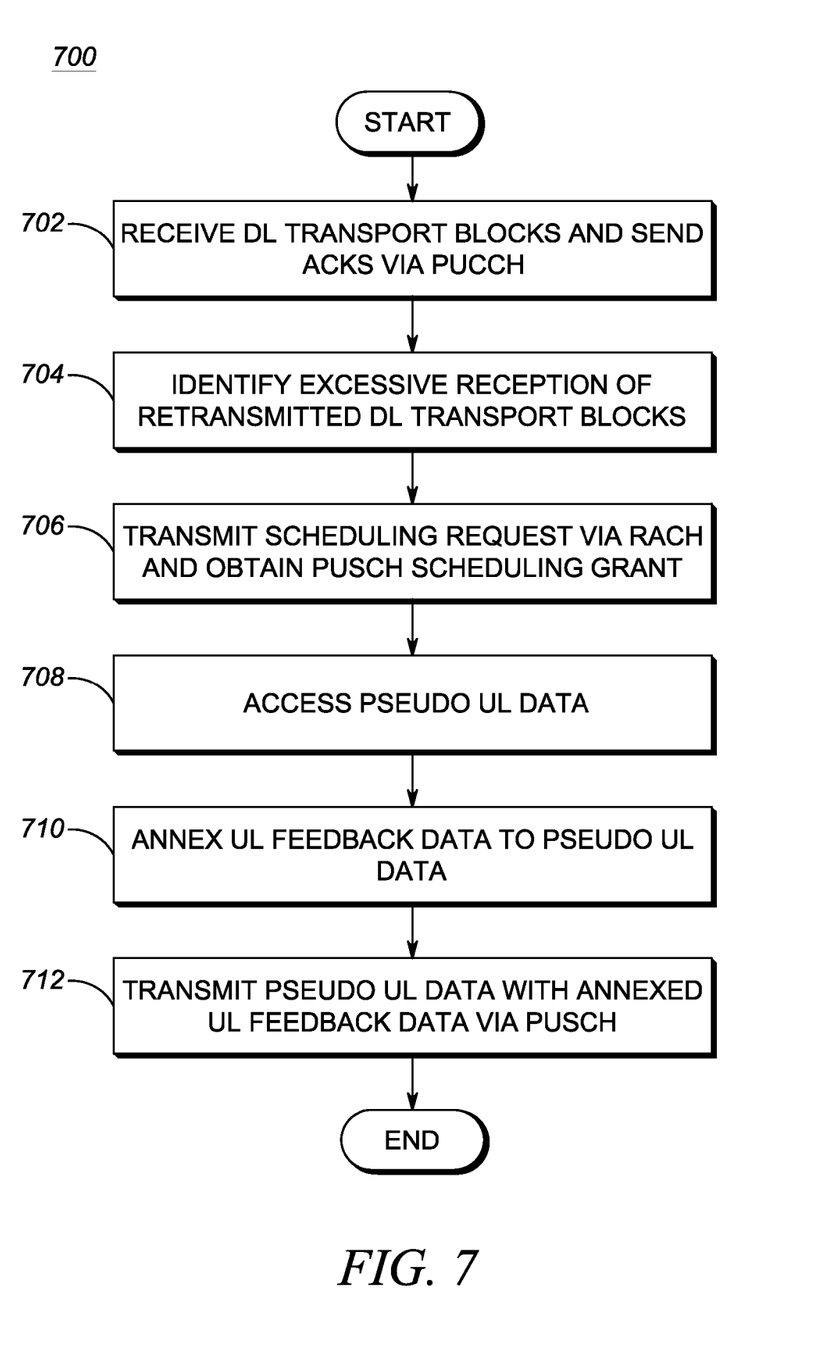
FIG. 7 depicts an example method.

FIG. 7 depicts a method that may be carried out by a wireless-communication device such as a UE, and is described below using the example UE 200(X) that is referenced in connection with FIGS. 5, 6, and 8. Method 700 begins at 702, with UE 200(X) receiving downlink transport blocks and responsively transmitting corresponding ACKs via the PUCCH.

Method 700 continues at 704, with UE 200(X) making a PUCCH-compromised determination, which involves making a determination that a number of retransmitted downlink transport blocks that has been received exceeds a retransmitted-block threshold, where UE 200(X) had previously sent, via the PUCCH, ACKs corresponding to prior transmissions of the received retransmitted downlink transport blocks.

Thus, UE 200(X) concludes that the PUCCH is likely to be somehow compromised at that time in light of the fact that UE 200(X) is successfully receiving a number of transport blocks, and is sending ACKs via the PUCCH to the eNodeB to indicate that successful receipt, but those ACKs must not be successfully being received by the eNodeB, evidenced by the fact that the eNodeB keeps retransmitting these already-acknowledged transport blocks (to a degree that exceeds a preset retransmitted-block threshold). UE 200(X) may make this determination with respect to a preceding time period, with respect to each of a plurality of preceding time periods, with respect to an average of retransmitted downlink transport blocks received across a plurality of preceding time periods, and/or according to one or more other approaches deemed suitable for a given implementation.

In at least one embodiment, making the PUCCH-compromised determination is done not only on the basis of the above-described determination pertaining to the retransmitted-block threshold, but also based at least in part on an evaluation of current channel conditions.

In at least one embodiment, the evaluation of current channel conditions involves determining that one or more of a signal-to-noise ratio (SINR), a reference signal receive power (RSRP), and a downlink modulation-and-coding scheme (MCS) exceeds a corresponding threshold. As to an MCS threshold, this could take the form of a given point in a list of possible MCSs ordered from the MCS associated with the lowest quality of wireless communication to the MCS associated with the highest quality of wireless communication, where exceeding such a threshold could take the form of a current MCS being between the given point in the list and the MCS associated with the highest quality of wireless communication.

In at least one embodiment, the evaluation of current channel conditions involves determining that one or more of an uplink transmit power, a number of uplink resource blocks transmitted, a number of uplink resource blocks scheduled for transmission, and an uplink MCS for some number of recent uplink PUSCH transmissions exceeds a respective corresponding threshold. In at least one embodiment, the evaluation of current channel conditions involves determining that a downlink MCS is more than an MCS-delta threshold lower than an expected MCS, wherein the expected MCS is based at least in part on an estimated signal-to-noise ratio SINR and at least in part on channel quality indicator (CQI) feedback. In some such embodiments, a determination of whether such an MCS-delta-threshold condition is satisfied could be made based on a number of places in an ordered list of possible MCSs such as the ordered list described above.

Responsive to making the PUCCH-compromised determination, UE 200(X) carries out steps 706-712 of method 700.

At 706, UE 200(X) transmits a scheduling-request message via the random access channel (RACH) and obtains a PUSCH scheduling grant. In at least one embodiment, step 706 involves including such a scheduling-request message with what is known as a RANDOM ACCESS MESSAGE 3 of what is known as a random access procedure. In general, LTE UEs transmit scheduling-request messages via the PUCCH; method 700, however, involves the UE transmitting the scheduling-request message via the RACH for at least the reason that the UE has already determined that the PUCCH is likely compromised.

At 708, UE 200(X) accesses pseudo uplink data, perhaps from data storage 306. In at least one embodiment, UE 200(X) generates the pseudo uplink data at some time prior to accessing the pseudo uplink data. In at least one embodiment, UE 200(X) generates the pseudo uplink data responsive to making the PUCCH-compromised determination.

In at least one embodiment, the pseudo uplink data includes one or more duplicate acknowledged-mode radio-link-control (RLC) layer ACKs. In at least one embodiment, the pseudo uplink data includes one or more IP packets addressed to an IP node. In at least one such embodiment, one or more of those IP packets are IP alarm packets that each have at least a predetermined size, that are each addressed to a monitoring server, and that each include an evolved cell global identifier of one or more UEs. In at least one such embodiment, one or more IP alarm packets include content to alert one or more network-side entities that the UE is having issues using the PUCCH.

At 710, UE 200(X) annexes uplink-feedback data to the pseudo uplink data, as described above. In at least one embodiment, the uplink-feedback data includes one or more of ACK/NACK indications, CQI feedback, and rank indications.

At 712, UE 200(X) transmits the pseudo uplink data and annexed uplink-feedback data via the PUSCH in accordance with the obtained PUSCH scheduling grant. This is shown generally in FIG. 8, which depicts aspects of a third example LTE uplink sub-frame 800. FIG. 8 is similar to FIGS. 5 and 6 in some aspects, and thus will be described with a focus on some relevant differences. As discussed above and as depicted in FIG. 8, once UE 200(X) has both pseudo uplink data and uplink-feedback data to send during a given sub-frame, UE 200(X) will annex the uplink-feedback data to the pseudo uplink data and then send the result of that annexation process via the PUSCH (group 810), and will not use the PUCCH (groups 808 and 812) to send any data during that sub-frame. In at least one embodiment, the UE will continue to send uplink-feedback data annexed to pseudo uplink data via the PUSCH for some ensuing time period before reevaluating whether the PUCCH is likely compromised.

By implementing the present apparatus and method, no change is required to the implementation of the eNodeB or any other network entity. The UE detects that the PUCCH is likely compromised based at least on a determination that the UE has received more than a threshold number of retransmissions of downlink transport blocks of which the UE had already acknowledged successful receipt via the PUCCH, and perhaps based also on current channel conditions, in that one or more evaluated channel conditions being generally positive would only strengthen an inference that the downlink, and hence likely the uplink shared channel (PUSCH) conditions are adequate, but that the PUCCH is not being adequately received and decoded.

Upon making a determination that the PUCCH is likely compromised, but not having any uplink data to otherwise send (such that uplink-feedback data would be piggybacked on the PUSCH when sending the uplink data), the UE accesses (perhaps after generating) pseudo uplink data, and then piggybacks the uplink-feedback data on the PUSCH when sending the pseudo uplink data, which the UE is sending at that time to effect a reliable transfer of uplink-feedback data via the PUSCH. The pseudo uplink data could then just be discarded on the network side, or it could be used as a redundant copy of certain data to increase confidence in that data, or it could be used as an "alarm" indicating the possible unintentional or perhaps intentional jamming of (i.e., interfering with) the PUCCH, and/or any other use or uses of such data could be made if deemed suitable for a given context.

In at least one embodiment, a wireless-communication device comprises a wireless-communication interface, a processor, and data storage containing program instructions executable by the processor for causing the wireless-communication device to carry out a set of functions. The set of functions includes receiving downlink transport blocks and responsively transmitting corresponding acknowledgement messages via a PUCCH. The set of functions further includes making a PUCCH-compromised determination, which comprises making a determination that a number of received retransmitted downlink transport blocks exceeds a retransmitted-block threshold, the wireless-communication device having previously transmitted, via the PUCCH, acknowledgement messages corresponding to prior transmissions of the received retransmitted downlink transport blocks. The set of functions further includes, responsive to making the PUCCH-compromised determination: transmitting a scheduling-request message via a RACH and obtaining a physical uplink shared channel PUSCH scheduling grant, accessing pseudo uplink data, annexing uplink-feedback data to the pseudo uplink data, and transmitting the pseudo uplink data and annexed uplink-feedback data via the PUSCH in accordance with the obtained PUSCH scheduling grant. In at least one embodiment, the wireless-communication device is embodied in a UE.

In at least one embodiment, making the PUCCH-compromised determination further comprises making the PUCCH-compromised determination based at least in part on an evaluation of current channel conditions. In at least one embodiment, the evaluation of current channel conditions comprises making a determination that one or more of a SINR, an RSRP, and a downlink MCS exceeds a respective corresponding threshold. In at least one embodiment, the evaluation of current channel conditions comprises making a determination that one or more of an uplink transmit power, a number of uplink resource blocks transmitted, a number of uplink resource blocks scheduled for transmission, and an uplink MCS for a set of one or more recent uplink PUSCH transmissions exceeds a respective corresponding threshold. In at least one embodiment, the evaluation of current channel conditions comprises making a determination that a downlink MCS is more than an MCS-delta threshold lower than an expected MCS, wherein the expected MCS is based at least in part on an estimated SINR and at least in part on CQI feedback.

In at least one embodiment, making the determination that the number of received retransmitted downlink transport blocks exceeds the retransmitted-block threshold comprises making a determination that the number of retransmitted downlink transport blocks received during a preceding time period exceeds the retransmitted-block threshold. In at least one embodiment, making the determination that the number of received retransmitted downlink transport blocks exceeds the retransmitted-block threshold comprises making a determination that, during each of a plurality of preceding time periods, the number of retransmitted downlink transport blocks received during the corresponding time period exceeds the retransmitted-block threshold. In at least one embodiment, making the determination that the number of received retransmitted downlink transport blocks exceeds the retransmitted-block threshold comprises making a determination that an average of the respective number of retransmitted downlink transport blocks received during each of a plurality of preceding time periods exceeds the retransmitted-block threshold.

In at least one embodiment, the set of functions further includes generating the pseudo uplink data. In at least one embodiment, generating the pseudo uplink data is carried out responsive to making the PUCCH-compromised determination. In at least one embodiment, the pseudo uplink data comprises duplicate acknowledged-mode RLC-layer acknowledgements. In at least one embodiment, the pseudo uplink data comprises one or more IP packets addressed to an IP node. In at least one embodiment, one or more of the IP packets are IP alarm packets, the IP alarm packets having at least a predetermined size, the IP alarm packets being addressed to a monitoring server, the IP alarm packets including an evolved cell global identifier of one or more UEs. In at least one embodiment, the uplink-feedback data comprises one or more of ACK/NACK indications, CQI feedback, and rank indications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
  a wireless-communication device receiving downlink transport blocks and responsively transmitting corresponding acknowledgement messages via a physical uplink control channel (PUCCH);
  the wireless-communication device making a PUCCH-compromised determination, wherein making the PUCCH-compromised determination comprises making a determination that a number of received retransmitted downlink transport blocks exceeds a retransmitted-block threshold, the wireless-communication device having previously transmitted, via the PUCCH, acknowledgement messages corresponding to prior transmissions of the received retransmitted downlink transport blocks; and
  responsive to making the PUCCH-compromised determination, the wireless-communication device:
    transmitting a scheduling-request message via a random access channel (RACH) and obtaining a physical uplink shared channel (PUSCH) scheduling grant,
    accessing pseudo uplink data,
    annexing uplink-feedback data to the pseudo uplink data, and
    transmitting the pseudo uplink data and annexed uplink-feedback data via the PUSCH in accordance with the obtained PUSCH scheduling grant.

2. The method of claim 1, wherein the wireless-communication device is embodied in a user equipment (UE).

3. The method of claim 1, wherein making the PUCCH-compromised determination further comprises making the PUCCH-compromised determination based at least in part on an evaluation of current channel conditions.

4. The method of claim 3, wherein the evaluation of current channel conditions comprises making a determination that one or more of a signal-to-noise ratio (SINR), a reference signal receive power (RSRP), and a downlink modulation-and-coding scheme (MCS) exceeds a respective corresponding threshold.

5. The method of claim 3, wherein the evaluation of current channel conditions comprises making a determination that one or more of an uplink transmit power, a number of uplink resource blocks transmitted, a number of uplink resource blocks scheduled for transmission, and an uplink modulation-and-coding scheme (MCS) for a set of one or more recent uplink PUSCH transmissions exceeds a respective corresponding threshold.

6. The method of claim 3, wherein the evaluation of current channel conditions comprises making a determination that a downlink modulation-and-coding scheme (MCS) is more than an MCS-delta threshold lower than an expected MCS, wherein the expected MCS is based at least in part on an estimated signal-to-noise ratio (SINR) and at least in part on channel quality indicator (CQI) feedback.

7. The method of claim 1, wherein making the determination that the number of received retransmitted downlink transport blocks exceeds the retransmitted-block threshold comprises making a determination that the number of retransmitted downlink transport blocks received during a preceding time period exceeds the retransmitted-block threshold.

8. The method of claim 1, wherein making the determination that the number of received retransmitted downlink transport blocks exceeds the retransmitted-block threshold comprises making a determination that, during each of a plurality of preceding time periods, the number of retransmitted downlink transport blocks received during the corresponding time period exceeds the retransmitted-block threshold.

9. The method of claim 1, wherein making the determination that the number of received retransmitted downlink transport blocks exceeds the retransmitted-block threshold comprises making a determination that an average of the respective number of retransmitted downlink transport blocks received during each of a plurality of preceding time periods exceeds the retransmitted-block threshold.

10. The method of claim 1, further comprising generating the pseudo uplink data.

11. The method of claim 10, wherein generating the pseudo uplink data is carried out responsive to making the PUCCH-compromised determination.

12. The method of claim 1, wherein the pseudo uplink data comprises duplicate acknowledged-mode radio-link-control (RLC) layer acknowledgements.

13. The method of claim 1, wherein the pseudo uplink data comprises one or more Internet Protocol (IP) packets addressed to an IP node.

14. The method of claim 13, wherein one or more of the IP packets are IP alarm packets, the IP alarm packets having at least a predetermined size, the IP alarm packets being addressed to a monitoring server, the IP alarm packets including an evolved cell global identifier of one or more user equipments (UEs).

15. The method of claim 1, wherein the uplink-feedback data comprises one or more of ACK/NACK indications, channel quality indicator (CQI) feedback, and rank indications.

16. A wireless-communication device comprising:
a wireless-communication interface;
a processor; and
data storage containing program instructions executable by the processor for causing the wireless-communication device to carry out a set of functions, the set of functions including:
receiving, via the wireless-communication interface, downlink transport blocks and responsively transmitting, via the wireless-communication interface, corresponding acknowledgement messages via a physical uplink control channel (PUCCH);
making a PUCCH-compromised determination, wherein making the PUCCH-compromised determination comprises making a determination that a number of received retransmitted downlink transport blocks exceeds a retransmitted-block threshold, the wireless-communication device having previously transmitted, via the PUCCH, acknowledgement messages corresponding to prior transmissions of the received retransmitted downlink transport blocks; and
responsive to making the PUCCH-compromised determination:
transmitting, via the wireless-communication interface, a scheduling-request message via a random access channel (RACH) and obtaining a physical uplink shared channel (PUSCH) scheduling grant,
accessing pseudo uplink data,
annexing uplink-feedback data to the pseudo uplink data, and
transmitting, via the wireless-communication interface, the pseudo uplink data and annexed uplink-feedback data via the PUSCH in accordance with the obtained PUSCH scheduling grant.

17. The wireless-communication device of claim 16, embodied in a user equipment (UE).

18. The wireless-communication device of claim 16, the set of functions further comprising generating the pseudo uplink data, wherein generating the pseudo uplink data is carried out responsive to making the PUCCH-compromised determination.

19. The wireless-communication device of claim 16, wherein the pseudo uplink data comprises one or more Internet Protocol (IP) packets addressed to an IP node.

20. The wireless-communication device of claim 16, wherein the uplink-feedback data comprises one or more of ACK/NACK indications, channel quality indicator (CQI) feedback, and rank indications.

* * * * *

UNITED STATES PATENT AND TRADEMARK OFFICE
CERTIFICATE OF CORRECTION

| | | |
|---|---|---|
| PATENT NO. | : 8,879,447 B1 | Page 1 of 1 |
| APPLICATION NO. | : 14/045636 | |
| DATED | : November 4, 2014 | |
| INVENTOR(S) | : Isam R. Makhlouf et al. | |

It is certified that error appears in the above-identified patent and that said Letters Patent is hereby corrected as shown below:

TITLE PAGE:

Item (72), under "Inventors", in Column 1, Line 1, delete "Isam R" and insert -- Isam R. --, therefor.

Item (72), under "Inventors", in Column 1, Line 2, delete "Ethan Y" and insert -- Ethan Y. --, therefor.

Item (72), under "Inventors", in Column 1, Line 3, delete "Dennis M" and insert -- Dennis M. --, therefor.

Item (56), under "OTHER PUBLICATIONS", in Column 2, Line 4, delete "Tresponse" and insert -- response --, therefor.

Signed and Sealed this
Tenth Day of May, 2016

Michelle K. Lee
*Director of the United States Patent and Trademark Office*